United States Patent
Haukas et al.

(10) Patent No.: US 8,291,817 B2
(45) Date of Patent: Oct. 23, 2012

(54) POTATO PEELING DEVICE

(75) Inventors: John Kristian Haukas, Aksdal (NO); Walter Johannes Bennett, Stol (NO)

(73) Assignee: John Kristian Haukas (NO)

( * ) Notice: Subject to any disclaimer, the term of this patent is extended or adjusted under 35 U.S.C. 154(b) by 482 days.

(21) Appl. No.: 12/710,930

(22) Filed: Feb. 23, 2010

(65) Prior Publication Data

US 2010/0212519 A1 Aug. 26, 2010

(30) Foreign Application Priority Data

Feb. 24, 2009 (NO) .................................. 20090847

(51) Int. Cl.
*A47J 17/00* (2006.01)
*A23N 7/02* (2006.01)
(52) U.S. Cl. ........................................... 99/541; 99/584
(58) Field of Classification Search ............... 99/540, 99/541, 574, 576, 584, 588, 593, 603, 617, 99/410
See application file for complete search history.

(56) References Cited

U.S. PATENT DOCUMENTS

| | | | | |
|---|---|---|---|---|
| 695,330 A | * | 3/1902 | McCaslin | 99/348 |
| 1,637,678 A | * | 8/1927 | Camilla et al. | 99/611 |
| 1,767,001 A | * | 6/1930 | Johnston | 210/307 |
| 1,945,978 A | | 2/1934 | Palombo et al. | |
| 2,407,819 A | * | 9/1946 | Dolan | 99/626 |
| 2,799,312 A | * | 7/1957 | Ervin | 99/637 |
| 2,813,376 A | * | 11/1957 | Middlemark | 451/67 |
| 2,860,371 A | * | 11/1958 | Krull | 452/99 |
| 3,266,540 A | * | 8/1966 | Bradham | 99/593 |
| 3,762,308 A | * | 10/1973 | Greene et al. | 99/632 |
| 4,173,051 A | * | 11/1979 | Reid | 15/3.12 |
| 4,211,002 A | * | 7/1980 | Kirk | 30/123.3 |
| 4,825,757 A | * | 5/1989 | Stoner | 99/279 |
| 4,998,467 A | * | 3/1991 | Kovach | 99/632 |
| 5,001,973 A | * | 3/1991 | Holcomb | 99/593 |
| 5,666,877 A | * | 9/1997 | Schadle | 99/588 |
| 2008/0060533 A1 | * | 3/2008 | Choi | 99/631 |

FOREIGN PATENT DOCUMENTS

DK 82326 C 11/1956
NO 307023 B1 1/2000

* cited by examiner

*Primary Examiner* — Sebastiano Passaniti
(74) *Attorney, Agent, or Firm* — Andrus, Sceales, Starke & Sawall, LLP

(57) ABSTRACT

There is described a potato peeling device comprising a container provided with an in the operational position at least partly open top, a releasable lid arranged to close the top of the container, a rotatable peeling plate disposed in the container and connected to a drive, and an outlet arranged for draining the container, where an inlet opening arranged for receiving a water jet, is disposed in or above the top of the container.

5 Claims, 1 Drawing Sheet

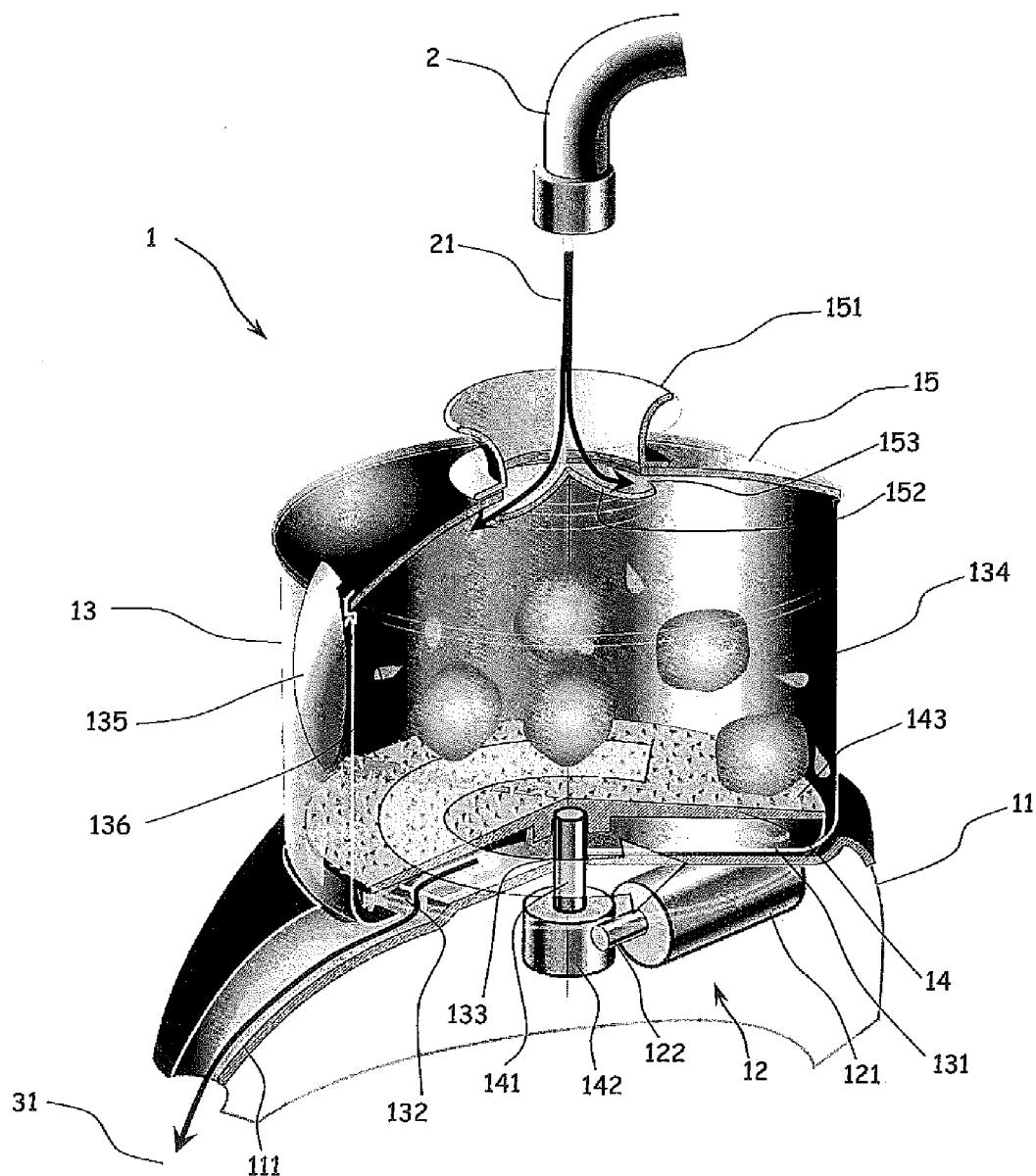

US 8,291,817 B2

POTATO PEELING DEVICE

CROSS-REFERENCE TO RELATED APPLICATION

This application claims priority of Norwegian Patent Application No. 20090847, filed Feb. 24, 2009, which is fully incorporated herein by reference.

BACKGROUND

A potato-peeling device is described; more particularly wherein an inlet funnel arranged to receive a water jet is disposed in or over the top of the container.

From prior art within the subject area are known a series of solutions. Potato peeling devices working with a closed volume of water are commonly known, as the water is filled into the container of the device before the peeling starts, and the water together with the waste from the peeling process is drained from the container after the completion of the peeling process. This is i.a. described in DK 82326 and U.S. Pat. No. 1,945,978. The drawbacks of these devices are that a considerable cleaning job is needed subsequent to a peeling operation, both of the potatoes having been in contact with the liquid mixture of water, soil residue and potato peel, and of the potato peeling device container and working organs having contained said liquid mixture.

From NO 307023 is known a water turbine driven potato-peeling device wherein water is continuously circulated through the container via an underlying blade wheel and up through a central path in a peeling plate for circulation in the container before the water is drained from the container. With that a relatively clean environment is continuously maintained in the container, and the peeled potatoes have a considerably higher degree of cleanliness. The drawback of the said technique is that a connection to a pressurised water plant, such as a utility water supply grid is needed, when the potato-peeling device is to be used. This makes the technology according to NO 307023 less applicable in situations where the potato-peeling device cannot be permanently connected to the water supply grid.

SUMMARY

A potato-peeling device is provided arranged for continuous draining of peeling water, wherein new water is added to a container via an opening in the upper portion of the container, typically in a removable lid or some other cover arranged for temporary or permanent closure of at least parts of the container upper portion. The supply of water is preferably done in the centre of the container to provide a good liquid distribution in the container. The supply of water is preferably provided by tapping directly from a pivotal charging spout on a fitting in a sink. A rotatable peeling plate is in a per se known manner disposed above the bottom of the container. The peeling plate is connected to a drive, preferably electrically powered, and more preferably arranged having power supply from a built-in battery unit. The lid is preferably provided with an inlet funnel arranged to capture the water jet from the charging spout, and inside in the lid and immediately below the inlet funnel is arranged a water distribution plate arranged to direct the incoming water outward toward the periphery of the container and also to prevent the water from splashing out from the inside of the container and up through the inlet funnel. The inlet funnel may be arranged like a handle. The lid may be provided in a transparent material such as glass to ease the inspection of the peeling process.

The potato-peeling device may be provided with one or more appliances arranged to hold the lid disengageably fixed to the container. An outlet spout disposed at the bottom of the container is arranged to direct the water to a discharge system such as a sink. The outlet spout is advantageously provided with a transparent portion arranged for further inspection of the peeling process, particularly monitoring of the state of the wastewater.

The invention relates more particularly to a potato peeling device comprising a container provided with an, in the operation position, at least partly open top, a releasable lid arranged to close the top of the container, a rotatable peeling plate disposed in the container and connected to a drive, and an outlet arranged for draining of the container, characterised in that an inlet opening arranged for receiving a water jet is disposed in or above the top of the container.

The inlet opening may be an inlet funnel disposed in the lid.

The inlet funnel may be provided with a distribution plate arranged downstream of the inlet funnel, as the distribution plate and the lid define one or more openings facing the sidewall of the container.

The inlet funnel may form a handle extending upward from the lid.

The drive may be provided with an electric motor.

The motor may be connected to an energy accumulator.

BRIEF DESCRIPTION OF THE DRAWING

In the following an example of a preferred embodiment as illustrated in the accompanying drawing is described, wherein:

FIG. 1 shows a potato-peeling device according to the invention in cut-through perspective.

DETAILED DESCRIPTION OF THE DRAWING

In the drawing the reference numeral 1 indicates a potato-peeling device comprising a base 11 housing a drive 12 and carrying a cylindrical container 13 having an open top 136 and with a rotatable, essentially circular peeling plate 14 disposed over a bottom plate 131 in the container 13. A lid 15 is arranged to be able to close the container top 136. The potato-peeling device may in an operational position be allocated an external charging spout 2, typically a highly placed, rotatable charging spout on a fitting (not shown) at a sink such as in a kitchen, being arranged to be able to provide a water jet 21. The potato-peeling device 1 is in an operational position connected to an external drain system (not shown) for draining of wastewater 31.

The base 11 forms a discharge spout 111 arranged to direct the wastewater 31 from the container 13 to the external discharge system. Advantageously a transparent inspection field (not shown) is disposed in a portion of the discharge spout to ease visual control of the run-off from the potato-peeling device.

The drive 12 comprises an electric motor 121 having a protruding drive shaft 122 in rotary engagement with the peeling plate 14. The motor 121 is connected to a power supply (not shown), such as a battery unit or a transformer connected to the ordinary power supply grid. A battery unit is preferred for safety reasons. The potato-peeling device 1 is provided with controls (not shown) for start/stop, and possibly also speed control of the motor 121.

The bottom plate 131 of the container 13 is provided with a discharge opening 132 in fluid communication with the discharge spout. The bottom plate 131 is provided with a central opening 133 arranged for running a drive shaft 141 on the peeling plate 14 therethrough. The central opening 133 is provided with the necessary supporting and sealing means (not shown) to provide a fluid tight sleeve for the drive shaft 141 and also a suitable supporting of it.

The container 13 is further provided with a sidewall 134 defining the open container top 136. On the outside shell surface of the sidewall 134 is disposed a locking device 135 arranged to be able to hold the lid 15 in a releasable grip when it covers the container top 136.

The peeling plate 14 is in a per se known way provided with a grinding surface 143 arranged to rub the potatoes to be peeled. On the drive shaft 141 extending downward from the peeling plate 14 is disposed a gear wheel 142 in rotary engagement with the drive shaft 122 of the motor 12 and forming an appropriate exchange of the rotary movement of the motor 12.

The lid 15, which may be formed in a fit for purpose material, such as glass or metal, is provided with an inlet funnel 151 encircling a recess in the lid 15 and extending up from the lid 15. A tapering distribution plate 152 having a diameter slightly larger than the extent of the recess is disposed just below said recess. A ring shaped opening 153 facing the sidewall 134 of the container 13 is thus formed between the periphery of the distribution plate 152 and the inside side surface of the lid 15.

The potato-peeling device 1 is in use typically positioned in a basin (not shown) in a work bench (not shown) where a suitable charging spout 2 is arranged. Subsequent to being filled with a suitable mass of potatoes, the lid 15 is put back in place on the container 13 and the charging spout 2 is swung in over the inlet funnel 151. Water is then continuously being supplied through the inlet funnel 151, and the peeling plate 14 is set in a rotating motion to provide the desired peeling effect. The water 21 continuously sluices the potatoes and brings along the waste from the potato peeling process, i.e. soil residue and peeled particles, which are brought out of the potato-peeling device 1 in that the effluent water 31 flows down through the discharge opening 132 and out through the waste spout 111 to the external effluent system (not shown).

Advantageously the container 13 is provided with a field making visual inspection of the potatoes being peeled possible. This is preferably provided in the lid 15, preferably by the lid being formed of a transparent material such as glass.

Advantageously the inlet funnel 151 is formed as a handle which may be used when the lid 15 is to be moved.

The potato-peeling device 1 according to the invention is simple to prepare and operate, as supply and drainage of water is provided by means of the ordinary water and effluent system available in the kitchen, and with a continuous through flow of water clean, peeled potatoes are provided straight from the potato-peeling device 1, which neither require comprehensive cleaning after the peeling operation is finished.

What is claimed is:

1. A potato-peeling device comprising
a container provided with an in the operational position at least partly open top,
a releasable lid arranged to close the top of the container,
a rotatable peeling plate disposed in the container and connected to a drive,
an outlet arranged for draining the container, and
an inlet opening arranged for receiving a water jet and disposed in or above the top of the container, wherein
the inlet opening is provided with a distribution plate disposed downstream of the inlet opening, the distribution plate and the lid defining one or more openings facing the sidewall of the container.

2. A device according to claim 1, wherein the inlet opening is an inlet funnel disposed in the lid.

3. A device according to claim 1, wherein the inlet opening forms a handle extending upward from the lid.

4. A device according to claim 1, wherein the drive is provided with an electric motor.

5. A device according to claim 4, wherein the motor is connected to an energy accumulator.

* * * * *